(12) United States Patent
Schroeder et al.

(10) Patent No.: US 10,181,714 B2
(45) Date of Patent: Jan. 15, 2019

(54) DISTRIBUTED ARC FAULT PROTECTION BETWEEN OUTLET AND CIRCUIT BREAKER

(71) Applicant: SCHNEIDER ELECTRIC USA, INC., Schaumburg, IL (US)

(72) Inventors: Jeremy D. Schroeder, Urbana, IA (US); Joseph Beierschmitt, Marion, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 231 days.

(21) Appl. No.: 15/024,571

(22) PCT Filed: Sep. 30, 2013

(86) PCT No.: PCT/US2013/062584
§ 371 (c)(1),
(2) Date: Mar. 24, 2016

(87) PCT Pub. No.: WO2015/047383
PCT Pub. Date: Apr. 2, 2015

(65) Prior Publication Data
US 2016/0241017 A1 Aug. 18, 2016

(51) Int. Cl.
*H02H 3/28* (2006.01)
*H02H 1/00* (2006.01)
(Continued)

(52) U.S. Cl.
CPC ............ *H02H 3/28* (2013.01); *H01H 9/54* (2013.01); *H02H 1/0015* (2013.01); *H02H 7/263* (2013.01)

(58) Field of Classification Search
CPC ........ H02H 1/0015; H01H 9/30; H01H 9/541; H01H 9/542
(Continued)

(56) References Cited

U.S. PATENT DOCUMENTS 4,870,529 A 9/1989 Powell et al.
4,922,368 A 5/1990 Johns
(Continued)

FOREIGN PATENT DOCUMENTS

FR 2749084 11/1997
GB 2449677 3/2008
(Continued)

OTHER PUBLICATIONS

International Search Report and Written Opinion dated Mar. 6, 2014 in PCT/US2013/062584, 18pp.
(Continued)

*Primary Examiner* — Dharti H Patel
(74) *Attorney, Agent, or Firm* — Locke Lord LLP (57) ABSTRACT

The disclosed methods and systems employ a nonprobability-based detection scheme that measures conditions (e.g., voltage or current) at multiple locations on a circuit, such as a branch circuit, to detect for a presence of an arc fault condition. A centralized processing system, such as a controller (120), receives information corresponding to a branch origin voltage or current measurement sensed by a sensor (114, 116) at a branch origin upstream of the plurality of end-use devices (150) on the branch circuit (e.g. at a circuit breaker defining the branch), and receives information corresponding to a downstream voltage or current measurement at each of the end-use devices sensed by a corresponding downstream sensor (152, 154).

12 Claims, 8 Drawing Sheets

(51) Int. Cl.
*H02H 7/26* (2006.01)
*H01H 9/54* (2006.01)

(58) Field of Classification Search
USPC .......................................... 361/2–6
See application file for complete search history.

(56) References Cited

U.S. PATENT DOCUMENTS

| | | | |
|---|---|---|---|
| 5,650,773 | A | 7/1997 | Chiarello |
| 5,896,262 | A | 4/1999 | Rae et al. |
| 5,973,896 | A | 10/1999 | Hirsh et al. |
| 5,986,860 | A | 11/1999 | Scott |
| 6,014,297 | A | 1/2000 | Clarey et al. |
| 6,084,756 | A | 7/2000 | Daring et al. |
| 6,144,537 | A | 11/2000 | Boteler |
| 6,178,077 | B1 | 1/2001 | Kaluza et al. |
| 6,292,337 | B1 | 9/2001 | Legatti et al. |
| 6,504,692 | B1 | 1/2003 | Macbeth et al. |
| 6,678,141 | B2 | 1/2004 | Schmidt et al. |
| 6,973,177 | B2 | 12/2005 | Mori et al. |
| 6,987,389 | B1 | 1/2006 | Macbeth et al. |
| 6,998,945 | B2 | 2/2006 | Huang et al. |
| 7,057,401 | B2 | 6/2006 | Blades |
| 7,068,045 | B2 | 6/2006 | Zuercher et al. |
| 7,253,640 | B2 | 8/2007 | Engel et al. |
| 7,359,168 | B2 | 4/2008 | Elms et al. |
| 7,362,552 | B2 | 4/2008 | Elms et al. |
| 7,362,553 | B2 | 4/2008 | Elms et al. |
| 7,385,406 | B1 | 6/2008 | Blades |
| 7,453,267 | B2 | 11/2008 | Westbrock, Jr. et al. |
| 7,463,465 | B2 | 12/2008 | Rivers et al. |
| 7,526,393 | B2 | 4/2009 | Thurmond et al. |
| 7,598,751 | B2 | 10/2009 | Collins, Jr. et al. |
| 7,697,248 | B2 | 4/2010 | Tomimbang |
| 7,791,346 | B2 | 9/2010 | Waite et al. |
| 7,826,184 | B2 | 11/2010 | Rivers et al. |
| 7,916,627 | B2 | 3/2011 | Berkowitz et al. |
| 8,085,055 | B2 | 12/2011 | Rupert |
| 8,098,465 | B1 | 1/2012 | Flegel |
| 2003/0156367 | A1 | 8/2003 | Macbeth |
| 2004/0008461 | A1* | 1/2004 | Kojovic .................. H02H 3/28 361/62 |
| 2004/0136125 | A1 | 7/2004 | Nemir et al. |
| 2005/0057261 | A1 | 3/2005 | Hale et al. |
| 2006/0092585 | A1 | 5/2006 | Chan et al. |
| 2006/0238932 | A1 | 10/2006 | Westbrock, Jr. et al. |
| 2007/0133134 | A1 | 6/2007 | Kilroy et al. |
| 2007/0183102 | A1 | 8/2007 | Seitz |
| 2007/0279068 | A1 | 12/2007 | Harres |
| 2008/0106832 | A1 | 5/2008 | Restrepo et al. |
| 2008/0129307 | A1 | 6/2008 | Yu et al. |
| 2008/0204034 | A1 | 8/2008 | Blades |
| 2009/0248329 | A1 | 10/2009 | Restrepo |
| 2009/0284875 | A1 | 11/2009 | Ford et al. |
| 2010/0238596 | A1 | 9/2010 | Wittner |
| 2010/0259859 | A1 | 10/2010 | Prabhu et al. |
| 2011/0170223 | A1 | 7/2011 | DeMarco et al. |
| 2012/0050933 | A1 | 3/2012 | Xu et al. |
| 2012/0068718 | A1 | 3/2012 | Hochwald et al. |
| 2012/0182038 | A1 | 7/2012 | Marzetta et al. |

FOREIGN PATENT DOCUMENTS

| | | |
|---|---|---|
| RU | 2311699 | 11/2007 |
| RU | 2484487 | 6/2013 |
| WO | WO2008146040 A1 | 12/2008 |

OTHER PUBLICATIONS

Extended European Search Report for Application No. 138947318-1806 / 3053235 PCT/US2013062584 dated May 30, 2017.

Russian Federal Service of Intellectual Property Search Report completed Sep. 10, 2017 for Application No. 2016105243/07(008438) PCT/ US2013/062584, with English language translation.

Chinese Office Action for Application No. 201380079924.9 dated Dec. 28, 2017.

* cited by examiner

Parallel Fault in Branch Wiring
$I_{Circuit\ Breaker} > I_A + I_B + I_C$

DISTRIBUTED ARC FAULT PROTECTION BETWEEN OUTLET AND CIRCUIT BREAKER

FIELD

The present disclosure relates generally to fault detection, and more particularly, to distributed arc fault detection on branch wiring.

BACKGROUND

An arc fault detection device is used to detect hazardous arcing events on a circuit, and in response, to trip a circuit interrupter and remove power to the circuit. These detection devices include Branch Circuit, Outlet Circuit and Combination Arc Fault Circuit Interrupters (AFCIs). Today's residential arc fault detection devices monitor and protect against arc faults from a single location, i.e. a branch origin or a first outlet. Since the device only measures branch circuit conditions from one location, a probability algorithm is required to detect hazardous arcing. Thus, there is a probability that an arc fault detection device may be subject to unwanted tripping, such as nuisance tripping or false positive tripping, which is an inconvenience to the user, or worse.

SUMMARY

The disclosed methods and systems employ a nonprobability-based arc fault detection scheme that measures conditions (e.g., voltage or current), via sensors, at multiple locations on a circuit, such as a branch circuit, to detect for a presence of an arc fault condition. In the disclosed methods and systems, the measured conditions at the branch origin and each end-use device are communicated back to a centralized processing system, such as a controller, via wired, wireless or powerline communication. The controller can determine a presence of an arc fault condition, if any, based on an evaluation of the measured conditions upstream at the branch origin and downstream at each end-use device. The controller can then issue a trip signal to trip the circuit breaker if an arc fault condition is detected. Accordingly, the disclosed methods and systems provide better arc fault detection than probabilistic arc fault detection systems. The disclosed methods and systems can isolate an arc fault between two branch elements. The energy draw per branch element on the branch circuit may also be monitored with the sensors employed in the disclosed methods and systems.

In one exemplary embodiment, the controller receives information corresponding to a branch origin voltage or current measurement sensed by an upstream sensor at a branch origin upstream of the plurality of end-use devices on the branch circuit (e.g. at a circuit breaker defining the branch). The controller also receives information corresponding to a downstream voltage or current measurement at each of the end-use devices sensed by a corresponding downstream sensor. The controller then compares the branch origin voltage or current measurement to the downstream voltage or current measurements at the end-use devices to identify any voltage or current irregularities on the circuit. The comparison may involve determining a voltage or current differential between the branch origin voltage or current measurement in relation to the downstream voltage or current measurements of the end-use devices, and then comparing the voltage or current differential to a threshold to ascertain if the voltage or current are within acceptable tolerances for the branch circuit. The controller detects for the presence of an arc fault condition based on the comparison, and trips the circuit breaker to interrupt current to the branch circuit if an arc fault condition is detected.

The disclosed methods and systems can detect for a series arc fault or a parallel arc fault. For example, a series arc fault contains impedance. Thus, a voltage differential, such as an excessive voltage drop, will occur across an arc fault. By measuring voltage at a branch origin and each downstream end-use device, the controller can determine a voltage drop across a section of branch wiring of the branch circuit with respect to each end-use device, e.g., a difference between the branch origin voltage and the downstream voltage across the end-use device. The voltage drop across each section of branch wiring can be compared to a voltage drop threshold to detect for a presence of an arc voltage, and thus, an arc fault. For example, a voltage drop in excess of a voltage drop threshold would indicate voltage irregularities reflecting the presence of a series arc fault. The controller can then issue a trip signal (e.g., a trip command) if an arc fault condition is detected. The voltage drop threshold can be a fixed threshold or a variable threshold based on a load current sensed on the branch circuit. For example, the threshold can vary directly with the load current, e.g., increase threshold to desensitize the system with greater load currents.

Furthermore, a parallel fault in the branch circuit increases the current draw as seen at the branch origin (e.g., by the circuit breaker); however, the sum of all currents at each downstream element will not increase. Therefore, a parallel fault has occurred if the branch origin current measurement is different from the sum of the current measurements for the end-use devices. Accordingly, the controller can be configured to calculate a differential current (e.g., a delta or change in current) between the current measurement for the branch origin and the sum of the current of each end-use device on the branch circuit. The controller can then compare the differential current to a current differential threshold to detect for a presence of an arc fault. For example, a calculated current differential in excess of a current differential threshold would indicate current irregularities reflecting the presence of a parallel arc fault. The controller can then issue a trip signal if an arc fault condition is detected.

BRIEF DESCRIPTION OF THE DRAWINGS

The description of the various exemplary embodiments is explained in conjunction with the appended drawings, in which.

DETAILED DESCRIPTION

Figure 1:
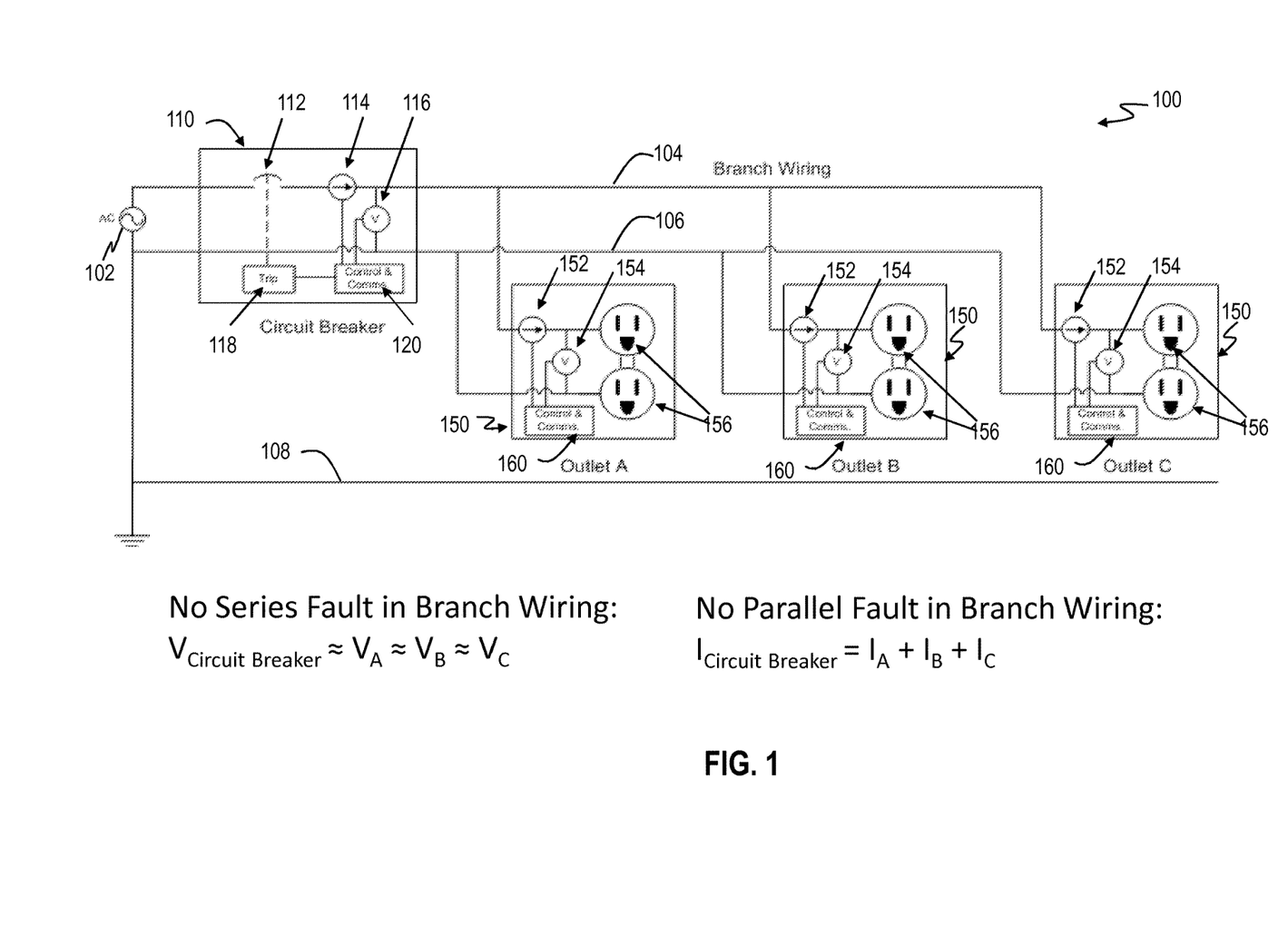
FIG. 1 is an exemplary arc fault detection system for a plurality of end-use devices, such as electrical outlets.

FIG. 1 shows an arc fault detection system 100 that includes a circuit breaker 110 and a plurality of downstream end-use devices 150, such as electrical outlets A, B and C, connected through branch wiring of a branch circuit. The system 100 includes an AC power source 102 which may be a conventional 200 Amp power line to a building such as a residence. A line conductor 104 which may serve as the branch wiring that couples the AC power source 102 to the circuit breaker 110 and the end-use devices 150. A neutral conductor 106 also couples the AC power source 102 to the circuit breaker 110 and the end-use devices 150. A ground line 108 also couples the circuit breaker 110 to the end-use device 150. As is understood, the circuit breaker 110 is used to protect against short circuits and other overload situations from the end-use device 150 by interrupting power to the end-use devices 150 in a case of an abnormal situation such as excessive current.

Figure 2:
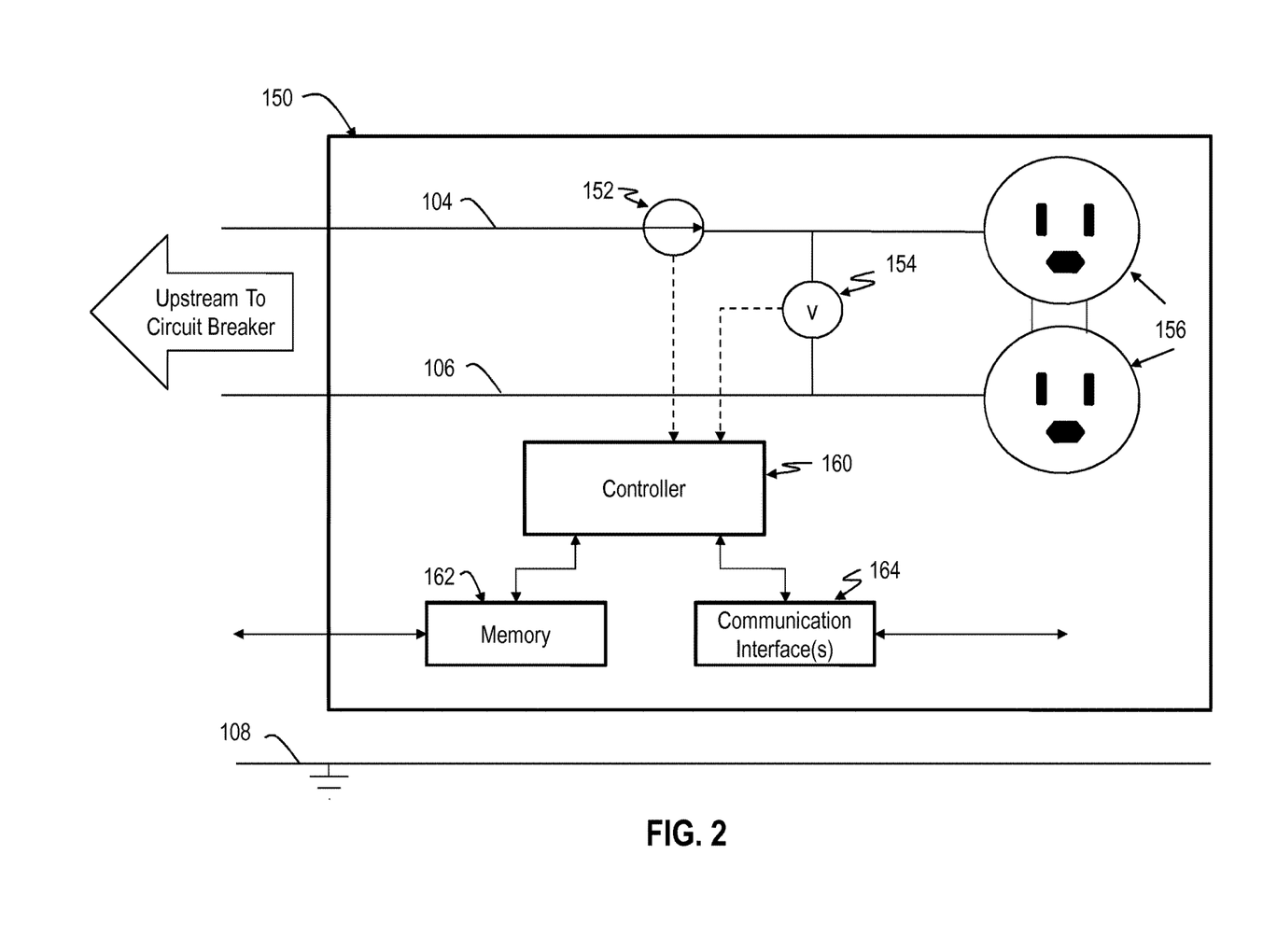
FIG. 2 illustrates a block diagram of exemplary components of an end-use device of FIG. 1, such as an electrical outlet, in accordance with an embodiment.

Each of the end-use devices 150 includes a controller 160 for controlling the components and operations of the end-use device, a downstream current sensor 152, and a downstream voltage sensor 154. The downstream current sensor 152 is coupled to sense current on the line conductor 104 and provide an output signal representative of the detected current on the line conductor 104 to the controller 160. The voltage sensor 154 is coupled between the line conductor 104 and the neutral conductor 106 to provide the voltage between the line and neutral conductors 104 and 106, respectively. The voltage sensor 154 provides an output signal representative of the detected voltage between the line conductor 104 and neutral conductor 106 to the controller 160. As shown in FIG. 2, the end-use device 150 can also include a memory 162 and a communication interface(s) 164 (e.g., communication circuitry) for conducting communications with other remote devices, such as the circuit breaker 110. The memory 162 can store data or computer executable code. The controller 160 can communicate information, such as the detected current or voltage at the end-use device 150, to the circuit breaker 110, via the communication interface 164. The end-use device 150 can conduct communications, via the communication interface 164, using a communication protocol to perform wireless, wired, or powerline communications.

In this example, the end-use devices 150 include conventional three-prong power outlets 156 which provide power when a load device is connected (plugged in). The end-use devices 150 may, however, include electrical devices other than electrical outlets, such as electrical switches (e.g., light switch), electrical receptacles, lighting devices, etc.

Figure 3:
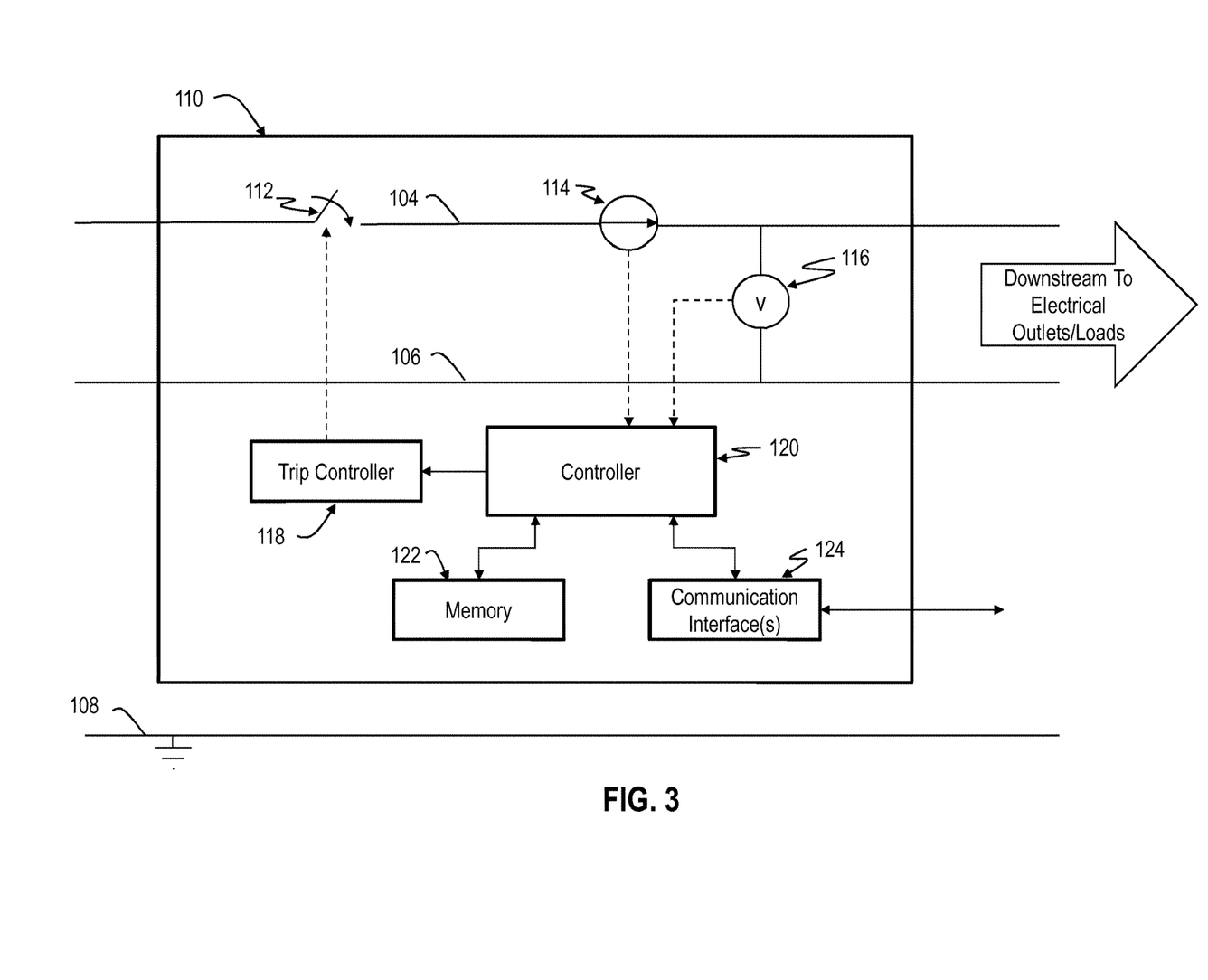
FIG. 3 illustrates a block diagram of exemplary components of a circuit breaker of FIG. 1, in accordance with an embodiment.

Turning back to FIG. 1, the circuit breaker 110 includes conventional overcurrent detection capabilities as well as arc fault detection by monitoring the current or voltage at the branch origin through upstream sensor(s) and at each end-use device through downstream sensor(s) as will be explained below. The circuit breaker 110 includes a trip controller 118, a controller 120 for controlling the components and operations of the circuit breaker 110, and upstream sensors, such as a current sensor 114 and a voltage sensor 116. The trip controller 118 controls a trip mechanism 112 (also referred to as a "circuit interrupter") which when activated interrupts the flow of power in the line conductor 104. The trip mechanism 112 may be a relay through which power flows when the relay is closed and interrupts power when the relay is open. Of course, other trip mechanisms may be used. As shown in FIG. 3, the circuit breaker 110 can also include a memory 122 and a communication interface(s) 124 (e.g., communication circuitry) for conducting communications with other remote devices, such as the end-use devices 150. The memory 122 can store data or computer executable code. The controller 120 is able to control communications, via the communication interface 124, with each of the end-use devices 150 to receive the detected current or voltage at the end-use devices 150. The circuit breaker 110 can conduct wireless, wired, or powerline communications with each of the end-use device 150, via the communication interface 124.

The current sensor 114 is coupled to sense current on the line conductor 104 and provide an output signal representative of the detected current on the line conductor 104 at the branch origin to the controller 120. The voltage sensor 116 is coupled between the line conductor 104 and the neutral conductor 106 to provide the voltage between the line and neutral conductors 104 and 106, respectively. The voltage sensor 116 provides an output signal representative of the detected voltage between the line conductor 104 and neutral conductor 106 at the branch origin to the controller 120. The controller 120 evaluates the detected current or voltage at the branch origin and at each of the end-use devices 150 to determine whether voltage or current irregularities exist, and controls the trip controller 118 to trigger the trip mechanism 112 when an abnormal condition, such as an arc fault condition, is detected.

Figure 4:
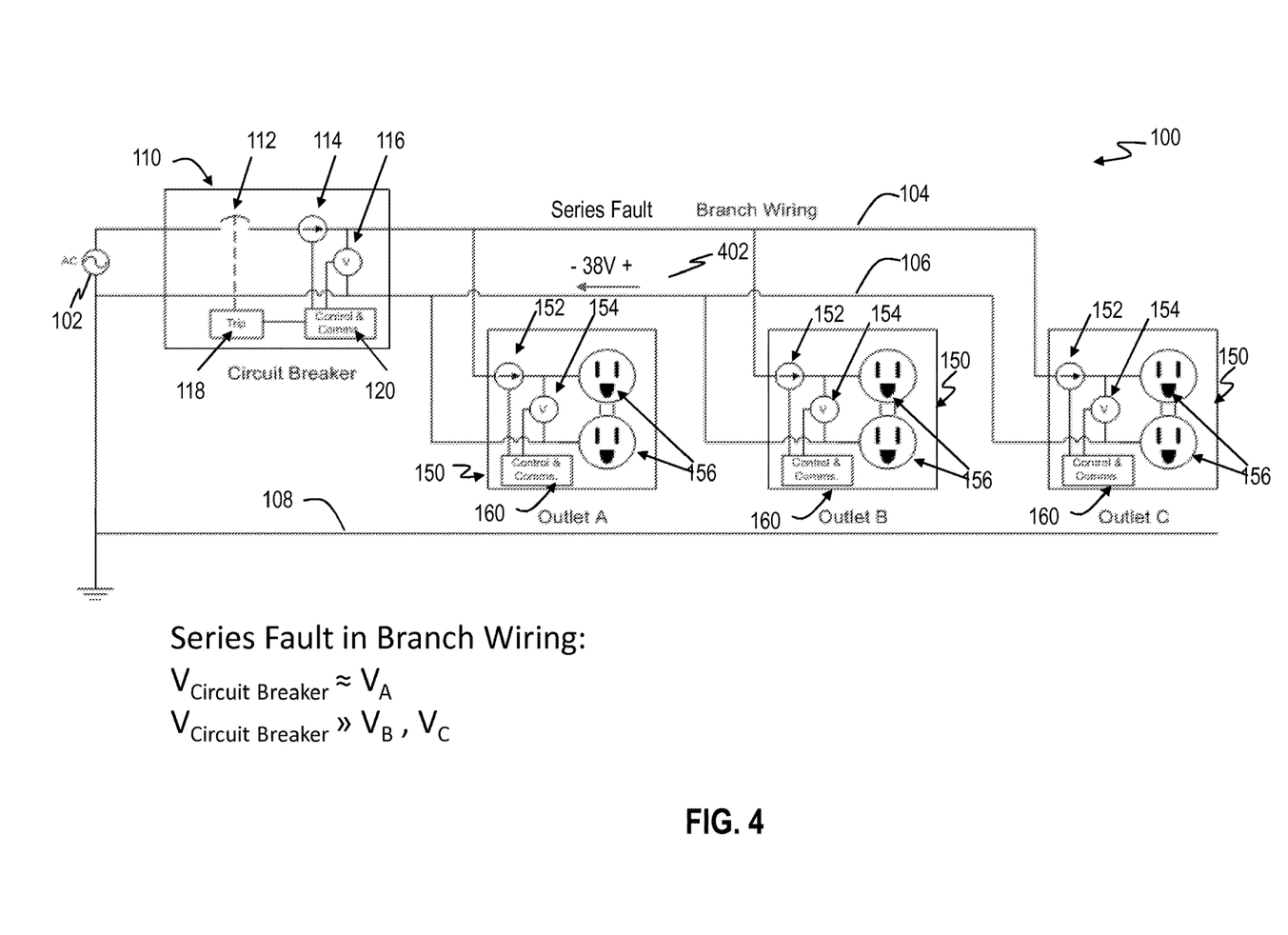
FIG. 4 is an exemplary circuit diagram showing the location of a series arc fault detected by the circuit breaker in FIG. 1.

As will be explained below with reference to FIGS. 4 and 5, the circuit breaker 110 provides arc fault detection and protection against a series arc fault condition and a parallel arc fault condition, respectively. FIG. 4 is an exemplary circuit diagram showing the location of a representative series arc fault 402 detected by the arc fault protection system 100. The series arc fault 402 may occur when an arc occurs on either the line conductor 120 or the neutral conductor 122.

For series arc fault detection, the controller 120 obtains voltage measurements at the branch origin and at each of the end-use devices 150 (e.g., electrical outlets A, B and C), calculates a voltage drop across a section of branch wiring (or "branch wiring section") 104, 106 of the branch circuit with respect to each end-use device 150, and compares each of the voltage drops to a voltage drop threshold, e.g., a voltage tolerance of the branch circuit. The voltage drop across a section of branch wiring with respect to an end-use device is the difference between the branch origin voltage measurement and the downstream voltage measurement at the end-use device. The voltage drop threshold can be a fixed threshold or a variable threshold based on a load current sensed on the branch circuit. For example, the threshold can vary directly with the load current, e.g., increase threshold to desensitize the system with greater load currents.

If each of the voltage drops is within the voltage tolerance (e.g., $V_{Branch\ Circuit} \approx V_A \approx V_B \approx V_C$), then there is no series arc fault. Otherwise, if any of the voltage drops exceeds the voltage tolerance, then the circuit impedance is too large and thus a series arc fault is detected by the controller 120. For example, as shown in FIG. 4, the voltage drop across a section of branch wiring with respect to each of the end-use devices 150, such as electrical outlets B and C, exceeds the voltage tolerance (e.g., $V_{Circuit\ Breaker} \gg V_B$ or $V_C$), thereby reflecting the presence of a large impedance on the branch circuit resulting from the series arc fault 402. If a series arc fault is present such as the series arc fault 402, the controller 120 causes the trip mechanism 112 to open via the trip controller 118.

Figure 5:
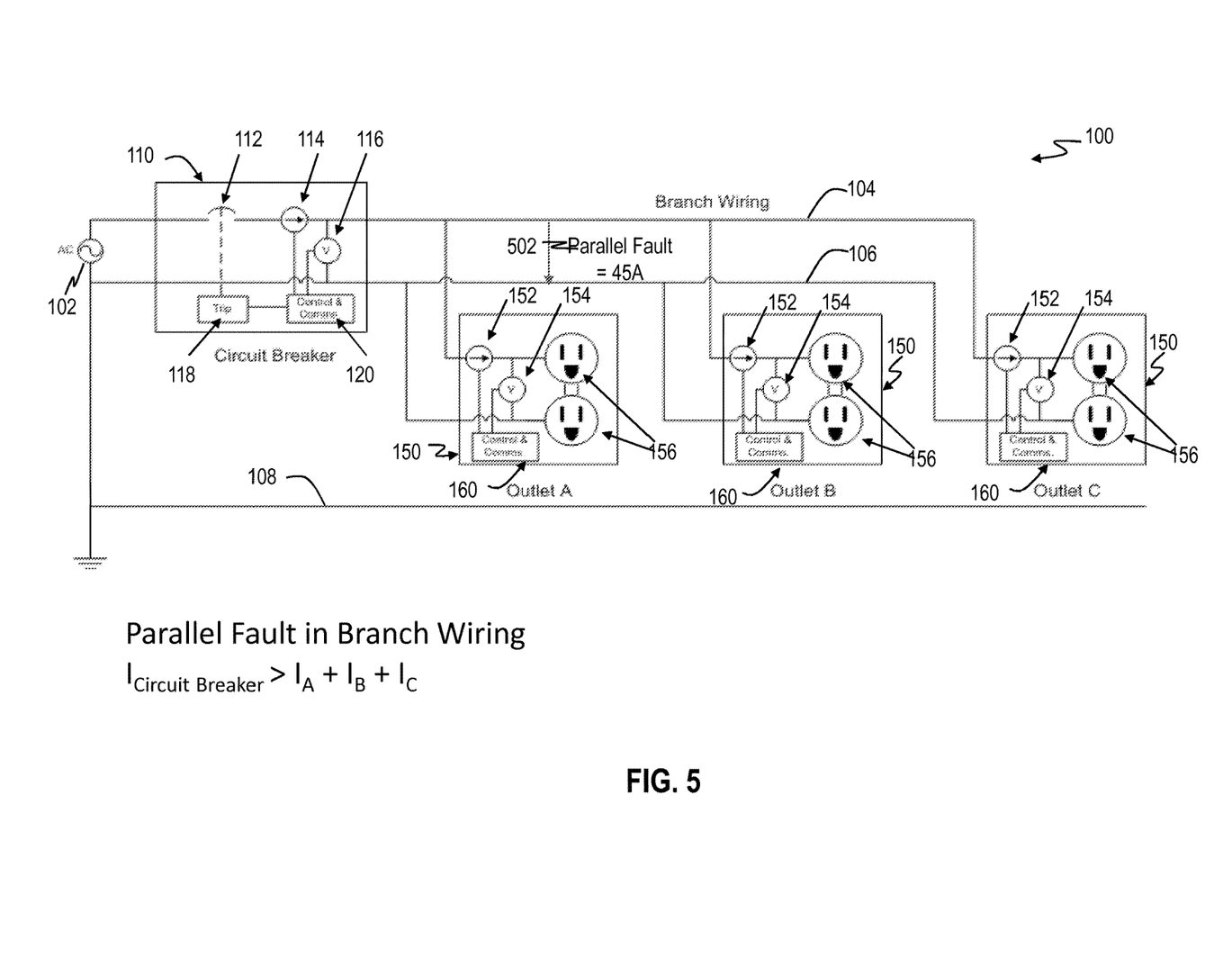
FIG. 5 is an exemplary circuit diagram showing the location of a parallel arc fault detected by the circuit breaker in FIG. 1.

FIG. 5 is an exemplary circuit diagram showing the location of a representative parallel arc fault 502 detected by the arc fault protection system 100. The parallel arc fault 504 may occur when an arc occurs between the line conductor 104 and the neutral conductor 106. Such an arc creates resistance by providing a path for current between the line conductor 104 and the neutral conductor 106.

For parallel arc fault detection, the controller 120 obtains current measurements at the branch origin and at each of the end-use devices 150 (e.g., electrical outlets A, B and C), and calculates a differential current between the branch origin current measurement and the sum of the downstream current measurements for each end-use device 150. The controller 120 then compares the differential current to a current differential threshold, e.g., a current tolerance of the branch circuit. If the current differential is within the current tolerance (e.g., $I_{Branch\ Circuit} \approx I_A + I_B + I_C$), then there is no parallel arc fault. Otherwise, if the calculated current differential exceeds the current tolerance, then a parallel arc fault is detected by the controller 120. For example, as shown in FIG. 5, the differential current exceeds the current tolerance (e.g., $I_{Branch\ Circuit} > I_A + I_B + I_C$), thereby reflecting the presence of a large resistance on the branch circuit resulting from the parallel arc fault 502. If a parallel arc fault is present such as the parallel arc fault 502, the controller 120 causes the trip mechanism 112 to open via the trip controller 118.

The advantages of the system 100 include performing fault detection in branch wiring of a branch circuit while avoiding the use of probabilistic detection algorithms since a definitive measurement of voltage or current at the branch origin and at each end-use device is provided to the circuit breaker 110. In the system 100, a centralized control system, e.g., the controller 110, gathers each of the measured conditions at the branch origin and at each end-use device, and determines a presence of an arc fault condition, if any, on the branch circuit based on the measured conditions. The system can isolate an arc fault between two branch elements, and determine a section of branch wiring in which the arc fault occurs. The system 100 results in better arc fault detection with better nuisance tripping avoidance than a probabilistic detection algorithm. The system may be incorporated in "Efficient Homes" applications or used as a troubleshooting tool to inform a user of arc fault locations. Further, the energy draw per branch element on the branch circuit may also be monitored with the sensors in the systems.

The controllers discussed herein, such as the controllers 120 and 160, may be a microprocessor, a processor, an application specific integrated circuit (ASIC), a programmable logic controller (PLC), a programmable logic device (PLD), a field programmable logic device (FPLD), a field programmable gate array (FPGA), discrete logic, etc. or any other similar device. The controllers 120 and 160 may include a memory (not shown) or access an external memory (e.g., 122 or 162), which may include hardware, firmware, or tangible machine-readable storage media that store instructions and data for performing the operations described herein. Machine-readable storage media includes any mechanism that stores information and provides the information in a form readable by a machine. For example, machine-readable storage media includes read only memory (ROM), random access memory (RAM), magnetic disk storage media, optical storage media, flash memory, etc.

Figure 6:
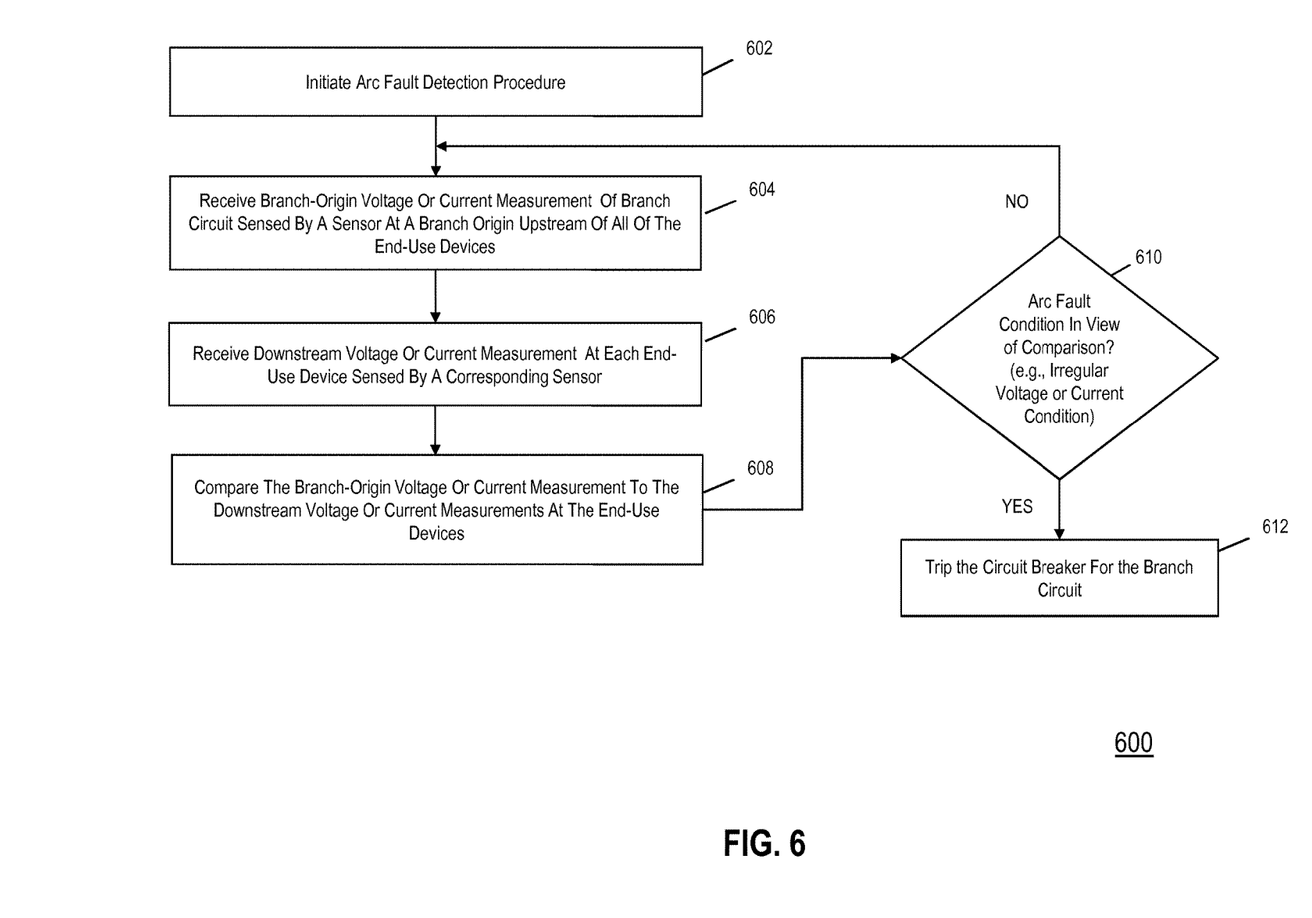
FIG. 6 illustrates a flow diagram of an exemplary control process performed by the controller of the arc fault protection system in FIG. 1 for detecting an arc fault on the branch circuit, in accordance with a disclosed embodiment.
Figure 7:
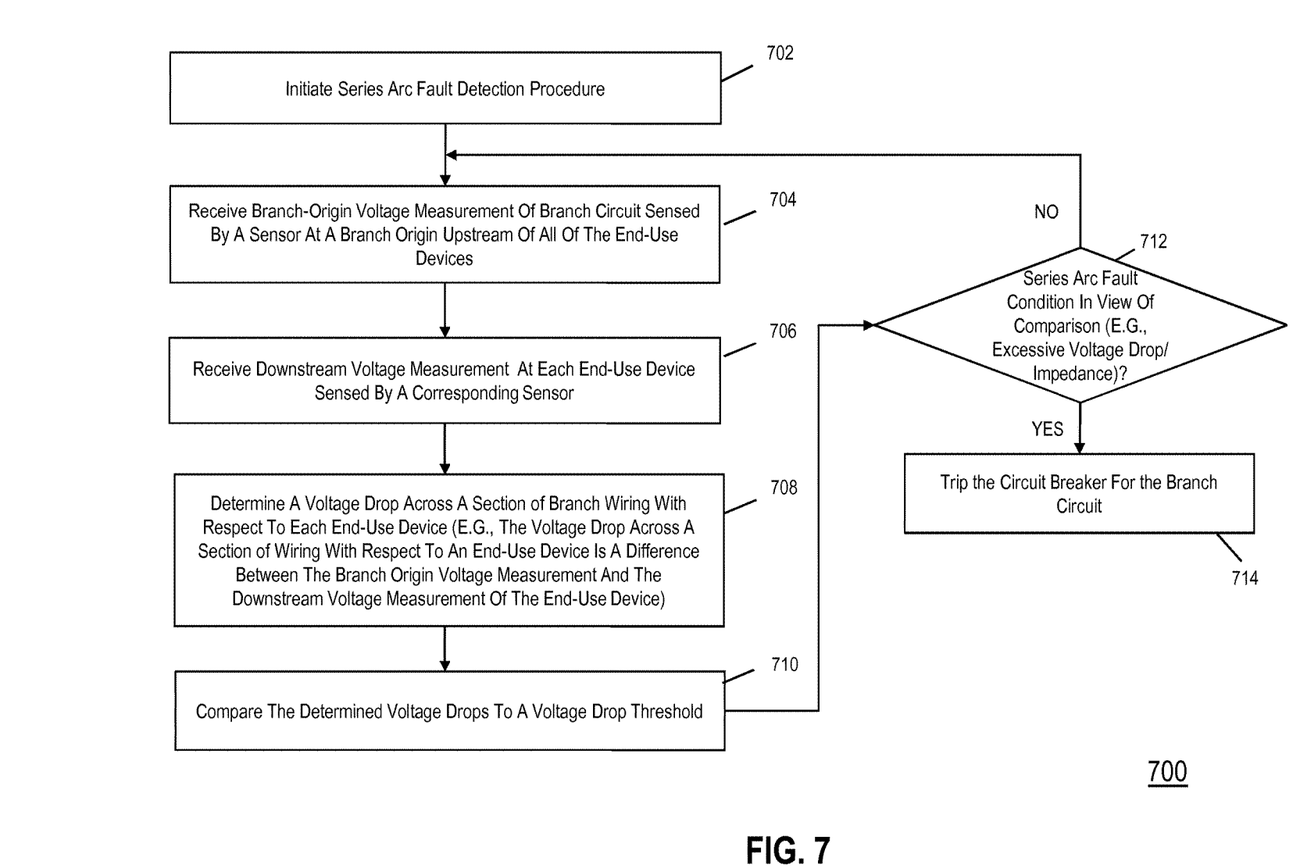
FIG. 7 illustrates a flow diagram of an exemplary control process performed by the controller of the arc fault protection system in FIG. 1 for detecting a series arc fault on the branch circuit, in accordance with a further disclosed embodiment.
Figure 8:
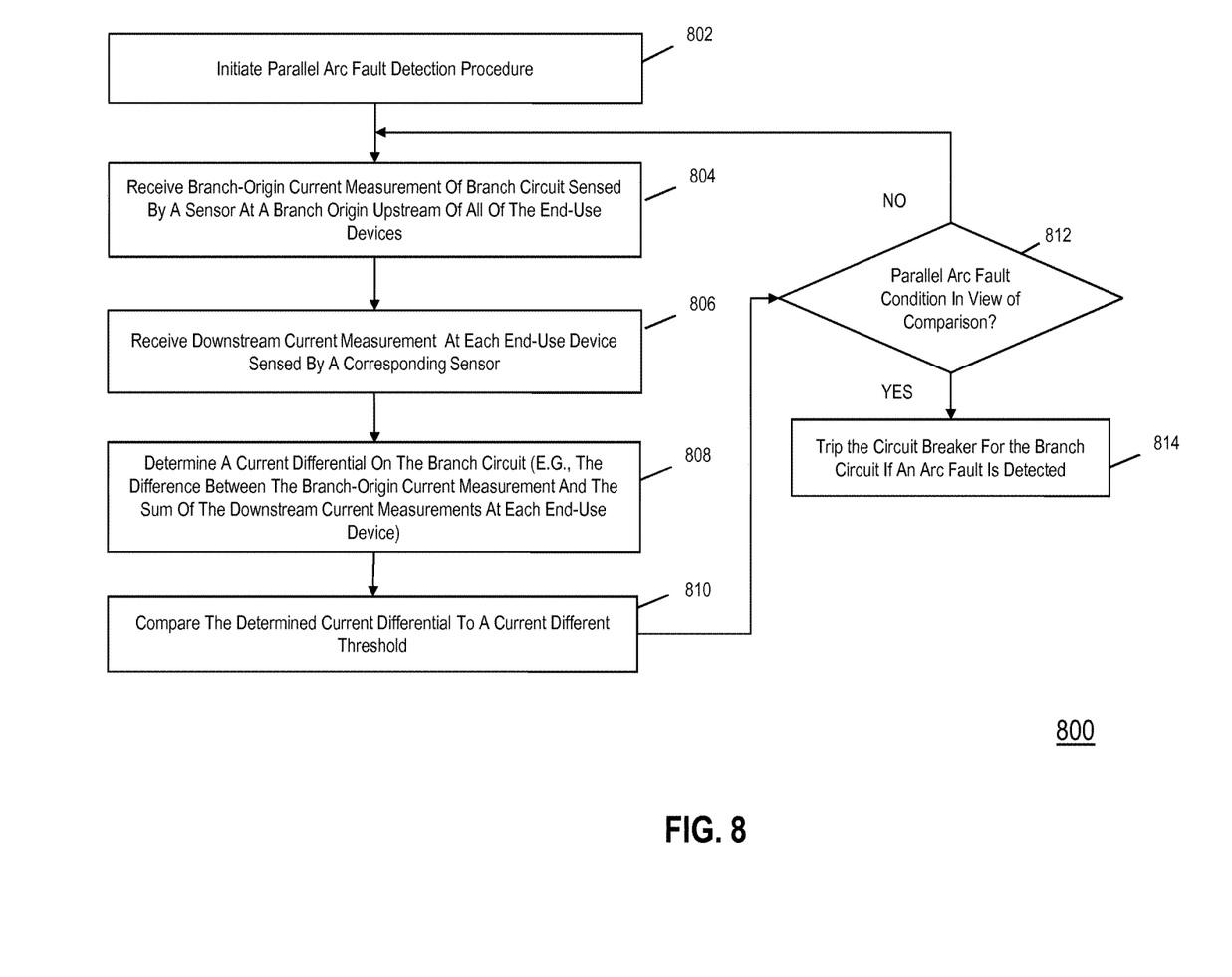
FIG. 8 illustrates a flow diagram of an exemplary control process performed by the controller of the arc fault protection system in FIG. 1 for detecting a parallel arc fault on the branch circuit, in accordance with another disclosed embodiment.

The operation of various exemplary decision algorithms to detect and protect against an arc fault will now be described with reference to FIGS. 1, 4 and 5 in conjunction with the flow diagrams shown in FIGS. 6 through 8. The flow diagrams in FIGS. 6 through 8 are representative of example machine-readable instructions for implementing the processes described above to detect and protect against arc faults. In this example, the machine readable instructions comprise algorithms for execution by: (a) a processor, (b) a controller, or (c) one or more other suitable processing device(s). The algorithms can be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the controllers, such as the controllers 120 and 160, in the system 100 of FIG. 1 could be implemented by software, hardware, and/or firmware. Further, although the exemplary algorithms are described with reference to the flow diagrams illustrated in FIGS. 6 through 8, persons of ordinary skill in the art will readily appreciate that other methods of implementing the example machine readable instructions might alternatively be used. For example, the order of execution of the blocks can be changed, and/or some of the blocks described can be changed, eliminated, or combined.

Turning to FIG. 6, a flow diagram is shown of an exemplary control process 600 performed by a controller (e.g., the controller 120) in the arc fault protection system 100 of FIG. 1 for detecting an arc fault on the branch circuit, in accordance with a disclosed embodiment.

At reference 602, the controller 120 initiates an arc fault detection procedure. At reference 604, the controller 120 receives a voltage or current measurement of the branch circuit sensed by an upstream sensor(s) (e.g., current sensor 114 or voltage sensor 116) at a branch origin upstream of all of the end-use devices 150. At reference 606, the controller 120 receives a downstream voltage or current measurement at each end-use device 150 sensed by a corresponding downstream sensor(s) (e.g., current sensor 152 or voltage sensor 154). At reference 608, the controller 120 compares the branch origin voltage or current measurement to the downstream voltage or current measurements at the end-use devices 150.

At reference 610, the controller 120 detects whether an arc fault condition exists based on the comparison. For example, the controller 120 determines whether there are irregularities in the voltage or current across each end-use device 150 in relation to the voltage or current at the branch origin based on the comparison. If not, the process 600 proceeds back to reference 604. Otherwise, at reference 612, if an arc fault condition is detected, the controller 120 issues a trip signal to trip the circuit breaker 110, via the trip controller 118 and the trip mechanism 112.

FIG. 7 illustrates a flow diagram of an exemplary control process 700 performed by the controller (e.g., controller 120) in the arc fault protection system 100 of FIG. 1 for detecting a series arc fault on the branch circuit, in accordance with a disclosed embodiment.

At reference 702, the controller 120 initiates a series arc fault detection procedure. At reference 704, the controller 120 receives a voltage measurement of the branch circuit sensed by an upstream sensor(s) (e.g., voltage sensor 116) at a branch origin upstream of all of the end-use devices 150. At reference 706, the controller 120 receives a downstream voltage measurement at each end-use device 150 sensed by a corresponding sensor(s) (e.g., voltage sensor 154). At reference 708, the controller 120 determines a voltage drop across a section of the branch wiring with respect to each end-use device 150. For example, the voltage drop across a branch wiring section with respect to an end-use device is a difference between the branch origin voltage measurement and the downstream voltage measurement of the end-use device.

At reference 710, the controller 120 compares the determined voltage drops to a voltage drop threshold (e.g., a voltage tolerance or standard deviation for the branch circuit). The voltage drop threshold can be a fixed threshold or a variable threshold based on a load current sensed on the branch circuit. For example, the threshold can vary directly with the load current, e.g., increase threshold to desensitize the system with greater load currents. At reference 712, the controller 120 determines whether a series arc fault condition exists based on the comparison. For example, if the voltage drop across the branch wiring section with respect to any of the end-use devices 150 (e.g., the voltage difference between the branch origin and electrical outlet A, the branch origin and outlet B and the branch origin and outlet C) is within a tolerance for the branch circuit, then the voltages are equal or approximately equal at the branch origin ($V_{Circuit\ Breaker}$), at the electrical outlet A ($V_A$), at the electrical outlet B ($V_B$) and at the electrical outlet C ($V_C$) as shown in FIG. 1 (discussed above). In this case, there is no series arc fault on the branch circuit so the process 700 proceeds back to reference 704.

However, if the voltage drop across the branch wiring section with respect to any of the end-use devices 150 exceeds the voltage tolerance for the branch circuit, then the controller 120 detects a series arc fault on the branch circuit. For example, if any of the voltages at the end-use device 150, e.g., $V_A$, $V_B$ and $V_C$, exceeds the voltage at the branch origin ($V_{Circuit\ Breaker}$), then a series arc fault, such as the series arc fault 402, exists such as shown in FIG. 4. In this case, the controller 120 issues a trip signal to trip the circuit breaker 110, via the trip controller 118 and the trip mechanism 112, at reference 714.

FIG. 8 illustrates a flow diagram of an exemplary control process 800 performed by the controller (e.g., controller 120) in the arc fault protection system 100 of FIG. 1 for detecting a parallel arc fault on the branch circuit, in accordance with a disclosed embodiment.

At reference 802, the controller 120 initiates a parallel arc fault detection procedure. At reference 804, the controller 120 receives a current measurement of the branch circuit sensed by an upstream sensor(s) (e.g., current sensor 114) at a branch origin upstream of all of the end-use devices 150. At reference 806, the controller 120 receives a downstream current measurement at each end-use device 150 sensed by a corresponding sensor(s) (e.g., current sensor 152). At reference 808, the controller 120 determines a current differential on the branch circuit. For example, the controller determines a difference between the branch origin current measurement and the sum of all of the downstream current measurements at each end-use device 150.

At reference 810, the controller 120 compares the determined current differential to a current differential threshold (e.g., a current tolerance or standard deviation for the branch circuit). For example, if the current differential is zero or within a tolerance for the branch circuit, then the current at the branch origin ($I_{Circuit\ Breaker}$) is equal or approximately equal to the sum of the current of each of the end-use devices 150 (e.g., $I_A+I_B+I_C$), such as shown in FIG. 1. In this case, there is no parallel arc fault on the branch circuit so the process 800 proceeds back to reference 804.

However, if the current differential exceeds the current tolerance for the branch circuit, then the controller 120 detects a parallel arc fault on the branch circuit. For example, if the current at the branch origin ($I_{Circuit\ Breaker}$) exceeds the sum of the current of the end-use devices 150 (e.g., $I_A+I_B+I_C$), then a parallel arc fault, such as the parallel arc fault 502, exists as shown in FIG. 5. In this case, the controller 120 issues a trip signal to trip the circuit breaker 110, via the trip controller 118 and the trip mechanism 112, at reference 814.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A method of determining an arc fault condition on a branch circuit connected to a circuit breaker and a plurality of end-use devices, the method implemented by a controller of the circuit breaker and comprising:
   receiving information corresponding to a branch origin voltage or current measurement sensed by an upstream sensor at a branch origin upstream of the plurality of end-use devices on the branch circuit;
   receiving information corresponding to a downstream voltage or current measurement at each of the end-use devices sensed by a corresponding downstream sensor;
   comparing the branch origin voltage or current measurement to the downstream voltage or current measurements at the end-use devices;
   detecting an arc fault condition based on the comparison; and
   issuing a trip signal to trip the circuit breaker if an arc fault condition is detected.

2. The method according to claim 1, wherein comparing comprises determining a voltage drop across a branch wiring section of the branch circuit with respect to each end-use device, the voltage drop across a branch wiring section with respect to an end-use device being a difference between the branch origin voltage measurement and the downstream voltage measurement of the end-use device, and
   wherein detecting detects an arc fault condition if the determined voltage drop across the branch wiring section with respect to any of the end-use devices exceeds a voltage drop threshold.

3. The method according to claim 2, wherein the voltage drop threshold is a variable threshold based on a load current sensed on the branch circuit.

4. The method according to claim 1, wherein comparing comprises calculating a current differential which is a difference between the branch origin current measurement and a sum of the downstream current measurements at each end-use device, and
    wherein detecting detects an arc fault condition if the determined current differential exceeds a current differential threshold.

5. The method according to claim 1, further comprising: determining a section of branch wiring in which the arc fault occurs.

6. An arc fault detection device for detecting an arc fault condition according to conditions monitored at multiple locations on a branch circuit, comprising:
    an upstream sensor for measuring a branch origin voltage or current at a branch origin upstream of the plurality of end-use devices on the branch circuit;
    a communications interface; and
    a controller configured to:
        receive information corresponding to the branch origin voltage or current measurement sensed by the sensor;
        receive, via the communication interface, information corresponding to a downstream voltage or current measurement at each of the end-use devices sensed by a corresponding downstream sensor;
        compare the branch origin voltage or current measurement to the downstream voltage or current measurements at the end-use devices;
        detect an arc fault condition based on the comparison; and
        issue a trip signal to trip a circuit breaker that defines the branch if an arc fault condition is detected,
    wherein the controller is in the circuit breaker.

7. The device according to claim 6, wherein to compare, the controller is configured to determine a voltage drop across a branch wiring section of the branch circuit with respect to each end-use device, the voltage drop across a branch wiring section with respect to an end-use device being a difference between the branch origin voltage measurement and the downstream voltage measurement of the end-use device, and
    wherein the controller is configured to detect an arc fault condition if the determined voltage drop across the branch wiring section with respect to any of the end-use devices exceeds a voltage drop threshold.

8. The device according to claim 7, wherein the voltage drop threshold is a variable threshold based on a load current sensed on the branch circuit.

9. The device according to claim 6, wherein, to compare, the controller is configured to calculate a current differential which is a difference between the branch origin current measurement and a sum of the downstream current measurements at each end-use device, and
    wherein the controller detects an arc fault condition if the determined current differential exceeds a current differential threshold.

10. The device according to claim 6, wherein the controller is further configured to determine a section of branch wiring in which the arc fault occurs.

11. A distributed arc fault detection system comprising:
    a plurality of end-use devices on the branch circuit, each end-use device including:
        a downstream sensor for measuring a voltage or current at the end-use device;
        a communications interface; and
        a controller configured to control transmission of voltage or current measurements via the communication interface to an arc fault detection device; and
    the arc fault detection system including:
        an upstream sensor for measuring a branch origin voltage or current at a branch origin upstream of the plurality of end-use devices on the branch circuit;
        an upstream communications interface; and
        an upstream controller configured to:
            receive information corresponding to the branch origin voltage or current measurement sensed by the upstream sensor;
            receive information from each end-use device corresponding to a downstream voltage or current measurement at the end-use devices;
            compare the branch origin voltage or current measurement to the downstream voltage or current measurements at the end-use devices;
            detect an arc fault condition based on the comparison; and
            issue a trip signal to trip a circuit breaker defining the branch if an arc fault condition is detected,
    wherein the upstream controller is in the circuit breaker.

12. The system according to claim 11, wherein each of the end-use devices transmits their voltage or current measurement to the upstream controller of the circuit breaker.

* * * * *